United States Patent
De Souza et al.

(10) Patent No.: US 7,273,511 B2
(45) Date of Patent: Sep. 25, 2007

(54) METHOD AND PLANT FOR ENRICHING A COMBUSTIBLE GAS MIXTURE IN AT LEAST ONE COMPONENTS THEREOF

(75) Inventors: Guillaume De Souza, Issy les Moulineaux (FR); Pascal Tromeur, Cercottes (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 448 days.

(21) Appl. No.: 10/504,941

(22) PCT Filed: Feb. 7, 2003

(86) PCT No.: PCT/FR03/00401

§ 371 (c)(1),
(2), (4) Date: Feb. 10, 2005

(87) PCT Pub. No.: WO03/068365

PCT Pub. Date: Aug. 21, 2003

(65) Prior Publication Data

US 2005/0120883 A1 Jun. 9, 2005

(30) Foreign Application Priority Data

Feb. 15, 2002 (FR) .................................. 02 01920

(51) Int. Cl.
*B01D 53/047* (2006.01)
*C01B 3/56* (2006.01)
(52) U.S. Cl. ............................................. 95/90; 96/121
(58) Field of Classification Search ................. 96/108, 96/121, 128; 95/90, 95, 116, 143; 423/248.1, 423/648
See application file for complete search history.

(56) References Cited

U.S. PATENT DOCUMENTS 3,029,829 A 4/1962 Glueck
5,137,547 A 8/1992 Chretien

FOREIGN PATENT DOCUMENTS

GB 2 337 212 11/1999

OTHER PUBLICATIONS

International Search Report for PCT/FR 03/00401.

*Primary Examiner*—Frank M. Lawrence
(74) *Attorney, Agent, or Firm*—Elwood Haynes

(57) ABSTRACT

A method and an apparatus for enriching a combustible gas. The gas mixture is initially flowing in a distribution line at a set pressure. Part of the mixture is bypassed to a separate line where it is then compressed. This compressed stream is then treated in a gas separation unit and is injected back into the distribution system at about the set pressure.

9 Claims, 1 Drawing Sheet

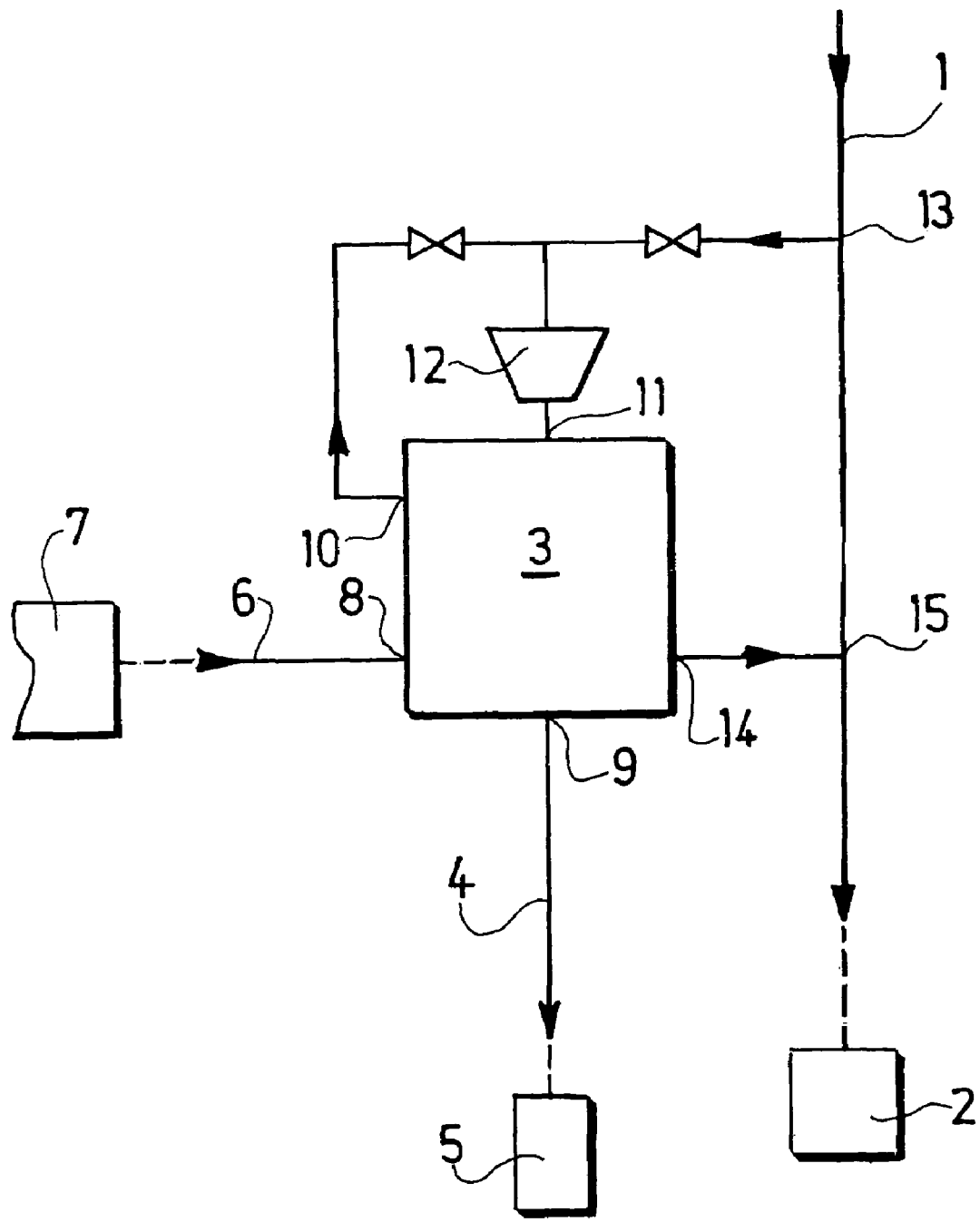

METHOD AND PLANT FOR ENRICHING A COMBUSTIBLE GAS MIXTURE IN AT LEAST ONE COMPONENTS THEREOF

BACKGROUND

The present invention relates to a method for enriching, in at least a first of its components, a combustible gas mixture comprising at least a second active component and flowing in a gas line at a first pressure.

Such combustible gas lines exist in numerous chemical and petrochemical plants, where they are used to supply burners and other heating stations.

Methods are known for enriching the combustible gas mixture with combustible components available as auxiliary gas at the outlet of active gas production units, the auxiliary gas being added to the gas mixture flowing in the line.

SUMMARY

A subject of the present invention is a method for enriching the combustible gas mixture flowing in the line by extracting a second of its components and reinjecting the first component into the line.

To do this according to the invention, the method comprises the following steps:
bypassing a partial stream from the gas line,
compressing this bypass stream to a second pressure above the first pressure,
treating the compressed bypass stream in a gas separation unit supplied with gas mixture to be separated at a pressure above the first pressure, advantageously close to the second pressure, and supplying at a first outlet a mixture rich in said second active component, and
reinjecting the treated stream into the line, from a second outlet of the separation unit, substantially at the first pressure.

BRIEF DESCRIPTION OF THE DRAWING

For a further understanding of the nature and objects for the present invention, reference should be made to the following detained description, taken in conjunction with the accompanying drawing, in which like elements are given the same or analogous reference numbers and wherein:

FIG. 1 illustrates an embodiment of the invention highlighting a distribution line for a combustible gas mixture which supplies various user stations in an industrial facility for heating active or passive elements.

DESCRIPTION OF PREFERRED EMBODIMENTS

The method of the invention comprises the following steps:
bypassing a partial stream from the gas line,
compressing this bypass stream to a second pressure above the first pressure,
treating the compressed bypass stream in a gas separation unit supplied with gas mixture to be separated at a pressure above the first pressure, advantageously close to the second pressure, and supplying at a first outlet a mixture rich in said second active component, and
reinjecting the treated stream into the line, from a second outlet of the separation unit, substantially at the first pressure.

A further subject of the present invention is an installation for putting this method into practice, comprising:
a line of combustible gas mixture,
a gas separation unit with an inlet for gas mixture to be separated, an outlet for production gas, an intermediate outlet, an intermediate inlet connected to the outlet of a compressor of which the inlet is connected to an upstream bypass point of the line and to the intermediate outlet of the unit, and an ancillary outlet connected to a downstream point of the line.

In the application considered here, this industrial facility comprises a unit 3, typically of the "PSA" adsorption type, supplying a purified production gas 4, typically hydrogen, to user stations 5 of the facility, from a synthesis gas mixture 6, typically produced by a catalytic reforming unit 7. The unit 3 hence comprises a main inlet 8 receiving the gas 6 at a high pressure and an outlet 9 producing the production gas 4 substantially at this high pressure. The unit 3 further comprises at least one intermediate outlet 10 from which a recycle gas, at a pressure lower than the high pressure, is sent to an intermediate inlet 11 of the unit 3.

According to an aspect of the invention, the intermediate inlet 11 is connected to the outlet of a compressor 12 of which the inlet is selectively connected to the intermediate outlet 10 and to an upstream bypass point 13 of the line 1. Correlatively, the unit 3 comprises an ancillary outlet 14 connected to a downstream injection point 15 of the line 1. More specifically, the unit 3 comprises at least three, typically at least four, adsorbers of which the inlets are selectively connectable to the inlet 8 of gas to be separated and to the intermediate inlet 11 and of which the outlets are selectively connectable to the outlet 9 of production gas and to the intermediate outlet 10.

Thus, according to the method of the invention, a bypassed portion of the combustible gas stream in the line 1 is treated, being compressed in the compressor 12, in the unit 3 as a recycled purge gas from this unit 3, thereby serving to extract hydrogen from this bypass stream to increase the production of hydrogen, and to return, via the auxiliary outlet 14, the treated bypass stream consisting in consequence nearly essentially of hydrocarbons, to reinject these hydrocarbons into the line 1 and thereby increase the heating value of the gas sent to the burners 2.

Typically the pressure in the line 1 is about 6 bar whereas the feed gas pressure 6 at the inlet 8 of the unit 3 is about 25 bar, the compressor 12 having a compression ratio of about 5.

Although the invention has been described in relation to a particular embodiment, it is not limited thereby but is susceptible to modifications and variants which will appear to a person skilled in the art within the framework of the claims below.

It will be understood that many additional changes in the details, materials, steps and arrangement of parts, which have been herein described in order to explain the nature of the invention, may be made by those skilled in the art within the principle and scope of the invention as expressed in the appended claims.

The invention claimed is:

1. A method for enriching a combustible gas mixture comprising:
    a) flowing said gas mixture in a gas line at a first pressure, wherein said gas mixture comprises at least a first component and a second component;
    b) diverting a portion of said gas mixture;
    c) compressing said portion to a second pressure greater than said first pressure;

d) treating said compressed portion in a gas separation unit wherein said unit is also supplied with a second gas mixture at a pressure greater than said first pressure;

e) supplying a mixture rich in said second component at a first outlet of said unit; and f) injecting into said line from a second outlet of said unit, a treated stream at substantially said first pressure, wherein the concentration of said first component is greater in said treated stream than in said gas mixture.

2. The method of claim 1, wherein said second component comprises hydrogen.

3. The method of claim 1, wherein said second gas mixture comprises a reforming gas.

4. The method of claim 1, wherein said gas separation unit comprises a unit of the adsorption type.

5. An apparatus for enriching a combustible gas mixture comprising:

a) a gas line for a gas mixture; and b) a gas separation unit, wherein said unit comprises:

1) a first inlet for a second gas mixture;

2) a first outlet;

3) an intermediate outlet;

3) an intermediate inlet wherein said intermediate inlet is connected to the outlet of a compressor and wherein the inlet of said compressor is connected to both an upstream bypass point on said gas line and to said intermediate outlet;

4) a second outlet connected to a downstream point of said line; and c) wherein said enriching comprises:

1) flowing said gas mixture in said gas line at a first pressure, wherein said gas mixture comprises at least a first component and a second component;

2) diverting a portion of said gas mixture;

3) compressing said portion to a second pressure greater than said first pressure;

4) treating said compressed portion in said gas separation unit wherein said unit is also supplied with said second gas mixture at a pressure greater than said first pressure;

5) supplying a mixture rich in said second component at said first outlet of said unit; and 6) injecting into said line from said second outlet of said unit, a treated stream at substantially said first pressure, wherein the concentration of said first component is greater in said treated stream than in said gas mixture.

6. The apparatus of claim 5, wherein said unit further comprises at least three adsorbers, wherein the inlets of said adsorbers are selectively connectable to said first inlet and to said intermediate inlet.

7. The apparatus of claim 6, wherein the outlets of said adsorbers are selectively connectable to said first outlet and to said intermediate outlet.

8. The apparatus of claim 7, wherein said second component comprises hydrogen.

9. The apparatus of claim 8, wherein said second gas mixture comprises a reforming gas.

* * * * *